(12) United States Patent
Mukai

(10) Patent No.: US 7,542,927 B2
(45) Date of Patent: Jun. 2, 2009

(54) PRODUCT PURCHASE SYSTEM, PRODUCT PURCHASE METHOD, A STORAGE MEDIUM FOR STORING A PROGRAM FOR EXECUTING THE PRODUCT PURCHASING METHOD, AND A SERVER USED THEREFOR

(75) Inventor: Shunichi Mukai, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/779,607

(22) Filed: Jul. 18, 2007

(65) Prior Publication Data

US 2008/0015957 A1    Jan. 17, 2008

Related U.S. Application Data

(62) Division of application No. 09/956,447, filed on Sep. 19, 2001, now Pat. No. 7,374,085.

(51) Int. Cl.
G06Q 30/00    (2006.01)
(52) U.S. Cl. .......................................... 705/26; 705/30
(58) Field of Classification Search ................ 705/30, 705/26
See application file for complete search history.

(56) References Cited

U.S. PATENT DOCUMENTS

| | | | |
|---|---|---|---|
| 6,032,130 A | 2/2000 | Alloul et al. | |
| 6,101,484 A | 8/2000 | Halbert et al. | |
| 6,230,146 B1 | 5/2001 | Alaia et al. | |
| 6,269,343 B1 * | 7/2001 | Pallakoff | 705/26 |
| 6,418,415 B1 | 7/2002 | Walker et al. | |
| 6,463,420 B1 * | 10/2002 | Guidice et al. | 705/28 |
| 6,584,451 B1 | 6/2003 | Shoham et al. | |
| 6,604,089 B1 | 8/2003 | Van Horn et al. | |
| 6,610,102 B1 * | 8/2003 | Aldred et al. | 715/234 |
| 6,631,356 B1 | 10/2003 | Van Horn et al. | |
| 6,876,983 B1 | 4/2005 | Goddard | |
| 6,889,896 B2 * | 5/2005 | Silverbrook et al. | 235/375 |
| 6,934,690 B1 | 8/2005 | Van Horn et al. | |
| 7,120,866 B2 * | 10/2006 | Kotler et al. | 715/209 |
| 7,451,107 B1 * | 11/2008 | Chvala et al. | 705/37 |

FOREIGN PATENT DOCUMENTS

| | | |
|---|---|---|
| JP | 10228508 | 8/1998 |
| JP | 11003005 | 1/1999 |

OTHER PUBLICATIONS

"Shinagawa Shopping District Challenges Activation by taking an Order via IT Vision", Nikkei Multi-Media, Japan, Nikkei BP, Inc., Feb. 15, 1999, No. 44, pp. 24-25. (English copy not available).

* cited by examiner

*Primary Examiner*—Andrew Joseph Rudy
(74) *Attorney, Agent, or Firm*—Yee & Associates, P.C.

(57) ABSTRACT

A product purchase system using a network comprises a server connected to a network 1, a database 5 included in the server 2 for storing order sheet data for each user, means connected to the network 1 for updating the order sheet data via the network 1, means for inhibiting the updating of the order sheet data after a predetermined date, means for aggregating the order sheet data of all users by summing up the quantities of ordered products for each type of the ordered products to obtain aggregated data after the predetermined date, and means for fixing, as order data, the order sheet data for each user and the aggregated data after the predetermined date.

5 Claims, 18 Drawing Sheets

ORDER SHEET: ORDER DEADLINE DATE XX.OO.2000
CUSTOMER GROUP ID: AAAA G0002450

| ORDER COLUMN | | | QUANTITY/MONEY/REMARK COLUMN | | | | | |
|---|---|---|---|---|---|---|---|---|
| PRODUCT NAME | QUANTITY | TOTAL | MEMBER A | MEMBER B | MEMBER C | MEMBER D | MEMBER E | MEMBER F |
| PRODUCT A | | | | | | | | |
| PRODUCT B | 2 | 10,000 | | | | | 2 | |
| PRODUCT C | 1 | 5,000 | 1 | | | | | |
| PRODUCT D | 5 | 1,000 | | 2 | 3 | | | |
| PRODUCT E | 1 | 120 | | | 1 | | | |
| PRODUCT F | 4 | 6,000 | 1 | 2 | | | | 1 |
| PRODUCT G | | | | | | | | |
| PRODUCT H | 3 | 7,500 | | 1 | | | | 2 |
| PRODUCT I | 1 | 2,500 | | | | 1 | | |
| GRAND TOTAL | | 32,120 | 6,500 | 3,600 | 720 | 2,500 | 10,000 | 6,500 |

FIG. 7

ORDER SHEET : ORDER DEADLINE DATE XX.OO.2000
CUSTOMER ID : BBBB P0003827

| ORDER COLUMN | QUANTITY/MONEY/REMARK COLUMN | | |
|---|---|---|---|
| PRODUCT NAME | QUANTITY | TOTAL | REMARK |
| PRODUCT A | | | |
| PRODUCT B | 2 | 10,000 | SPECIAL ORDER |
| PRODUCT C | 1 | 5,000 | |
| PRODUCT D | 5 | 1,000 | |
| PRODUCT E | 1 | 120 | |
| PRODUCT F | 4 | 6,000 | |
| PRODUCT G | | | |
| PRODUCT H | 3 | 7,500 | |
| PRODUCT I | 1 | 2,500 | |
| GRAND TOTAL | | 32,120 | |

FIG. 8

FIXED ORDER SHEET : ORDER DEADLINE DATE XX.OO.2000

| ORDER COLUMN | | | QUANTITY/MONEY/REMARK COLUMN | | | | | |
|---|---|---|---|---|---|---|---|---|
| PRODUCT NAME | QUANTITY | TOTAL | GROUP 1 | GROUP 2 | GROUP 3 | GROUP 4 | MEMBER A | MEMBER B |
| PRODUCT A | 6 | 12,000 | 1 | | 2 | 1 | 1 | 1 |
| PRODUCT B | 30 | 150,000 | 11 | 8 | 6 | 2 | 2 | 1 |
| PRODUCT C | 22 | 110,000 | 8 | 5 | 5 | 4 | 0 | 0 |
| PRODUCT D | 12 | 2,400 | 2 | 2 | 6 | | 1 | 1 |
| PRODUCT E | 8 | 960 | | 3 | 1 | 2 | 1 | 1 |
| PRODUCT F | 31 | 46,500 | 7 | 12 | 5 | 7 | 2 | |
| PRODUCT G | 2 | 3,800 | | | 1 | | | 1 |
| PRODUCT H | 15 | 37,500 | 4 | 1 | 5 | 5 | | |
| PRODUCT I | 7 | 17,500 | 1 | 1 | 4 | 1 | | |
| GRAND TOTAL | | 380,660 | aaaaaa | bbbbbb | cccccc | eeeeee | ffffff | gggggg |

FIG. 11

ORDER SHEET : ORDER DEADLINE DATE XX.OO.2000
ORDER STATUS UNTIL XX

| PRODUCT NAME | PRODUCT A | PRODUCT B | PRODUCT C | PRODUCT D | PRODUCT E | PRODUCT F | PRODUCT G | PRODUCT H | PRODUCT I |
|---|---|---|---|---|---|---|---|---|---|
| CURRENT NUMBER OF ORDERS ON XX | 11 | 3 | 8 | 4 | 10 | 7 | 3 | 2 | 5 |

FIG. 14

ORDER SHEET : ORDER DEADLINE DATE XX.OO.2000
CUSTOMER GROUP ID : CONFIRM PRODUCT DELIVERY AAAA G0002450

| ORDER COLUMN | QUANTITY/MONEY/REMARK COLUMN | | | | | | |
|---|---|---|---|---|---|---|---|

| PRODUCT NAME | QUANTITY | TOTAL | MEMBER A | MEMBER B | MEMBER C | MEMBER D | MEMBER E | MEMBER F |
|---|---|---|---|---|---|---|---|---|
| PRODUCT A | | | | | | | | |
| PRODUCT B | 2 | 10,000 | | | | | 2 | |
| PRODUCT C | 1 | 5,000 | 1 | | | | | |
| PRODUCT D | 5 | 1,000 | | 2 | 3 | | | |
| PRODUCT E | 1 | 120 | | | 1 | | | |
| PRODUCT F | 4 | 6,000 | 1 | 2 | | | | 1 |
| PRODUCT G | | | | | | | | |
| PRODUCT H | 3 | 7,500 | | 1 | | | | 2 |
| PRODUCT I | 1 | 2,500 | | | | 1 | | |
| GRAND TOTAL | | 32,120 | 6,500 | 3,600 | 720 | 2,500 | 10,000 | 6,500 |

HAVE THE PRODUCTS ABOVE BEEN DELIVERED ?   YES   NO

FIG. 15

ORDER SHEET: ORDER DEADLINE DATE XX.OO.2000
CUSTOMER GROUP ID: AAAA G0002450

| ORDER COLUMN | | | QUANTITY/MONEY/REMARK COLUMN | | | | | |
|---|---|---|---|---|---|---|---|---|
| PRODUCT NAME | QUANTITY | TOTAL | MEMBER A | MEMBER B | MEMBER C | MEMBER D | MEMBER E | MEMBER F |
| PRODUCT A | | | | | | | | |
| PRODUCT B | 2 | 10,000 | | | | | 2 | |
| PRODUCT C | 1 | 5,000 | 1 | | | | | |
| PRODUCT D | 5 | 1,000 | | 2 | 3 | | | |
| PRODUCT E | 1 | 120 | | | 1 | | | |
| PRODUCT F | 4 | 6,000 | 1 | 2 | | | | 1 |
| PRODUCT G | | | | | | | | |
| PRODUCT H | 3 | 7,500 | | 1 | | | | 2 |
| PRODUCT I | 1 | 2,500 | | | | 1 | | |
| GRAND TOTAL | | 32,120 | 6,500 | 3,600 | 720 | 2,500 | 10,000 | 6,500 |

FIG. 16

PRODUCT PURCHASE SYSTEM, PRODUCT PURCHASE METHOD, A STORAGE MEDIUM FOR STORING A PROGRAM FOR EXECUTING THE PRODUCT PURCHASING METHOD, AND A SERVER USED THEREFOR

This application is a divisional of application Ser. No. 09/956,447, filed Sept. 19, 2001, now U.S. Pat. No. 7,374,085, which is herein incorporated by reference.

FIELD OF THE INVENTION

The present invention relates to the distribution of products via a network. In particular, the present invention pertains to a product purchasing system and method for quickly and smoothly distributing products via a network, a computer-readable storage medium on which a program for executing the product purchasing method is stored, and a server used therefor.

BACKGROUND ART

In recent years, the distribution of products or goods has become voluminous. In such a situation, a person who desires to purchase a product tends to forget which product he or she has ordered, or tends to incorrectly remember or record the number thereof. Further, a product supplier must correctly and quickly process orders received from purchasers. Such a product purchase system is used in various fields of transactions, specifically, in a cooperative buying organization, a direct delivery system for farm products, and various mail order systems.

A product distribution system will now be described by using as an example the current cooperative that can reduce unit prices of individual products through cooperative buying. The cooperative buying as practiced by the current cooperatives has become popular, which provides consumers with products through cooperative stocking or entrusted production in response to consumer's demands for special products, such as organic vegetables, products in which the density of agricultural chemicals is low, high quality products or uniquely specified products.

FIG. 1 shows a typical cooperative buying system. This cooperative buying system collects orders from members who belong to particular groups, or general members who do not belong to any group, for each periodical deadline date established for ordering products and collecting money, collectively requests production on order and delivery, and collectively delivers the products to the contracting groups and collects money therefrom. This cooperative buying system will now be described in detail.

(1) A cooperative buying organization such as a cooperative association (hereinafter referred to as a shop) registers groups of multiple members and general members such as personal contractors (hereinafter referred to as users), and periodically distributes, to these users, product catalogs and order sheets which may be printed materials listing the products. A group leader is appointed for each group, who distributes the order sheets and products, and collects money. The product catalogs and the order sheets are periodically updated, and seasonal products for special order may be added for a special season such as the New Year.

(2) A user who desires to order a product refers to a related product catalog, and enters the quantity of each product that is ordered on the order sheet on which a form corresponding to the product catalog is printed. In case of a group, the leader of the group collects requests from the group members, and prepares a single consolidated order sheet. Currently, this order sheet is typically an OCR form.

(3) After a deadline date that was previously set for the completion of orders, the shop collects the orders from the users, and processes the orders using a proprietary order reception system. Further, depending on the products ordered, the shop entrusts the production of the products to manufacturers, or purchases the products from other wholesalers or venders, or supplies the products from its local stock. After a predetermined period has elapsed following the deadline date, the shop delivers or distributes the products to the respective registered users, i.e., groups and/or general members. The delivery may be done once a week or once every two weeks.

(4) After the products have been delivered, a group leader distributes the products among the members of that group, and collects money to pay for them. Subsequently, the leader pays the collected money to the shop, which then pays to the respective product suppliers from which the shop purchased the products, thus completing the transactions.

The following problems are encountered in the existing product purchase system described above.

<Problems at a User Site>

(1) Collecting orders from group members is a troublesome work. For example, when a group purchases products, the load imposed on a leader is excessive because the leader has to collect and record a number of orders, and to accept changes to the orders and additions of new orders, which are laborious and time-consuming.

(2) When a record of orders is maintained and a group purchases products based on this record, a group leader has to aggregate payments for each member and collect money. This is a troublesome work and requires much labor and time.

(3) When products are ordered, items listed on an order form are entered manually regardless of whether the products are being purchased by a group or an individual. Thus, errors tend to occur in the entered prices of the products ordered by a user, and much labor and time are required of the user. Further, if errors occur in the calculation of payments, much labor should be involved in the product distribution and collection of money.

(4) In case of a group, each group member has to keep his/her own order record by transcription or copying from the original record. In some cases, members may lose the records, or may not record orders at all. Further, when a record is transcribed to a different sheet of paper, an error in writing may occur, resulting in some confusion.

(5) In addition, a longer period of time may be required from ordering the products until actually delivering the products due to the above erroneous conditions, so that the product distribution cannot be performed smoothly. Further, since orders are continuously and periodically issued, for example, every two weeks, double ordering and/or missing orders may occur inadvertently at the user side unless the order record is maintained.

<Problems at Shop and Product Supplier Sites>

On the other hand, the following problems are observed at the shop and product supplier sites.

(1) Labor, time and cost are required each time product catalogs and order sheets are prepared and printed.

(2) Since the creation and management of such order sheets lead to an extended time required to supply products to users, some users may no longer have interest in the products at the time they are actually delivered and may, therefore, be reluctant to use such a system, which would hinder further growth of the cooperative buying system.

(3) While an OCR can be used for aggregating the order sheets, it requires time and hands to manage deadlines and to enter the aggregated data into the order receiving and placing system. Therefore, such a system may not be efficient.

(4) A lead time of several weeks is generally required from ordering till delivering since manufacturing of products is entrusted or the products are stocked after an order is received, which would not satisfy consumer's requirements, as compared with other product distribution systems, and prevent the expansion of the cooperative buying system.

(5) Furthermore, particulars of a delivery schedule must be issued and distributed to each user for confirmation of an order, and particulars of direct debit must also be issued and distributed to each user for accountancy, which would require extra labor and time.

(6) Trouble may also be caused by an aggregate error due to user's misinput on an OCR form or a failure in the OCR.

(7) In the transactions with users, exception processes for handling order sheets which have not been received before a deadline date may occur so that complicated deadline management is required. FIG. 2 illustrates the individual steps in the operational flow of the conventional product purchase system and method. As described above, there are several problems in the conventional product purchase systems, e.g., product purchasing through a cooperative, and there is a strong demand for a smoothly operating product distribution system.

SUMMARY OF THE INVENTION

The above problems are solved by the present invention which provides a product purchase system, a product purchase method, a computer-readable storage medium on which a program for executing the product purchase method is stored, and a server to be used therefor.

According to the present invention, provided is a product purchase system using a network comprising a server connected to said network, a database, included in said server, for storing order sheet data for each user, means, connected to said network, for updating said order sheet data via said network, means for inhibiting the updating of said order sheet data after a predetermined date, means for aggregating said order sheet data of all users by summing up the quantities of ordered products for each type of the ordered products to obtain aggregated data after said predetermined date, and means for fixing, as order data, said order sheet data for each of said users and said aggregated data after said predetermined date.

In the present invention, said order sheet data for each user can be corrected by the users at any time via the network until the predetermined date has been reached. In the present invention, even after said predetermined date has been reached, said order sheet data can be referred to by the users at any time via the network. The present invention may further comprise means for summing up the quantities of ordered products for each type of the ordered products included in the order sheet data of each user to obtain temporary aggregated data before said predetermined date is reached, and means for providing said temporary aggregated data as order reception status data to be referenced. The present invention may be used as an order receiving and placing system for a cooperative, a direct delivery system for farm products, or mail order. The present invention may further comprise means for delivering the products to the respective users based on said order sheet data, and for storing delivery confirmation as information corresponding to the order sheet data for each user in said server when the users confirm the delivery of said products, whereby the users can refer to the delivery status at any time via the network.

According to the present invention, further provided is a product purchase method using a network comprising the steps of updating, via said network, order sheet data stored in a database included in a server, said order sheet data being prepared for each user, inhibiting the updating of said order sheet data after a predetermined date, aggregating said order sheet data of all users by summing up the quantities of ordered products for each type of the ordered products to obtain aggregated data after said predetermined date, and fixing, as order data, said order sheet data for each of said users and said aggregated data after said predetermined date. In the present invention, the step of updating the order sheet data via said network includes a step of permitting said users to refer to said order sheet data at any time before a predetermined date is reached. In the present invention, even after said predetermined date has been reached, said order sheet data can be referred to by the users at any time via the network. The present invention may further comprise the steps of summing up the quantities of ordered products for each type of the ordered products included in the order sheet data of each user to obtain temporary aggregated data before said predetermined date is reached, and providing said temporary aggregated data as order reception status data to be referred to.

The present invention may be used in an order receiving and placing system of a cooperative, a direct delivery system for farm products, or mail order. The present invention may further comprise the step of delivering the products to the respective users based on said order sheet data, and storing delivery confirmation as information corresponding to said order sheet data for each user in said server when the users confirm the delivery of said products, whereby the users can refer to the delivery status at any time via the network.

According to the present invention, further provided is a computer-readable storage medium on which a program for executing a product purchase method using a network is stored, said program executing the steps of updating, via said network, order sheet data for each user stored in a database included in a server, inhibiting the updating of said order sheet data after a predetermined date, aggregating the quantities of ordered products of all users to obtain aggregated data after said predetermined date, and fixing, as order data, said order sheet data for each user and said aggregated data after said predetermined date.

In the present invention, the step of updating said order sheet data via said network may be performed by the users at any time before a predetermined date is reached. In the present invention, even after said predetermined date has been reached, said order sheet data can be referred to by the users at any time via the network. The present invention may be used for an order receiving and placing system of a cooperative, a direct delivery system for farm products, or mail order. In the present invention, the products are delivered to the respective users based on said order sheet data, and, when the users confirm the delivery of said products, the delivery confirmation is stored as information corresponding to said order sheet data for said users in said server, whereby the users can refer to the delivery status at any time via the network.

According to the present invention, further provided is a server used for purchasing products via a network comprising a database for storing order sheet data for each user, means, connected to said network, for updating said order sheet data via said network, means for inhibiting the updating of said order sheet data after a predetermined date, means for aggregating said order sheet data of all users by summing up the quantities of ordered products for each type of the ordered products to obtain aggregated data after said predetermined date, means for fixing, as order data, said order sheet data for each of said users and said aggregated data after said predetermined date, and means for ordering products based on said fixed order sheet data.

In the present invention, said order sheet data for each user can be corrected by the users at any time via the network until said predetermined date is reached. In the present invention, even after said predetermined date has been reached, said order sheet data can be referred to by the users at any time via the network.

BRIEF DESCRIPTION OF THE DRAWINGS

FIG. 7 is a diagram showing an order sheet used in the invention.

FIG. 8 is a diagram showing an alternative order sheet used in the invention.

FIG. 11 is a diagram showing a fixed order sheet used in the product purchase method of the invention.

FIG. 14 is a diagram showing a display screen of temporarily aggregated data obtained by an order reception status confirmation program.

FIG. 15 is a diagram showing a display screen of delivery confirmation presented to a user on a web page according to the product purchase system of the invention.

FIG. 16 is a diagram showing a display screen of an order sheet presented to a user on a web page according to the product purchase system of the invention.

DESCRIPTION OF THE PREFERRED EMBODIMENTS

The preferred embodiments of the invention will now be described in detail with reference to the accompanying drawings. It should be noted that the embodiments are presented for an illustration purpose only and the present invention is not limited thereto.

Figure 1:
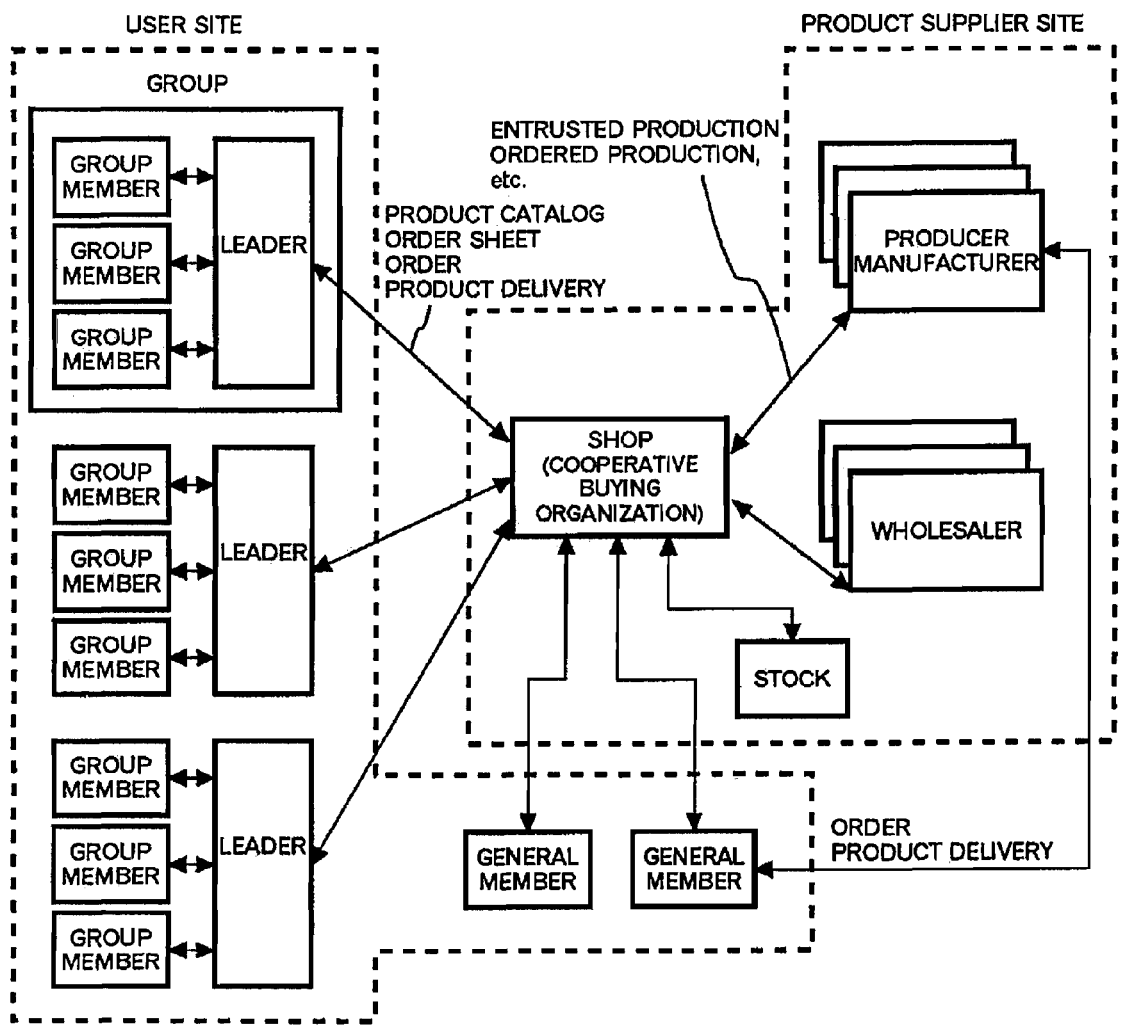
FIG. 1 is a diagram showing a conventional product purchase system.
Figure 2:
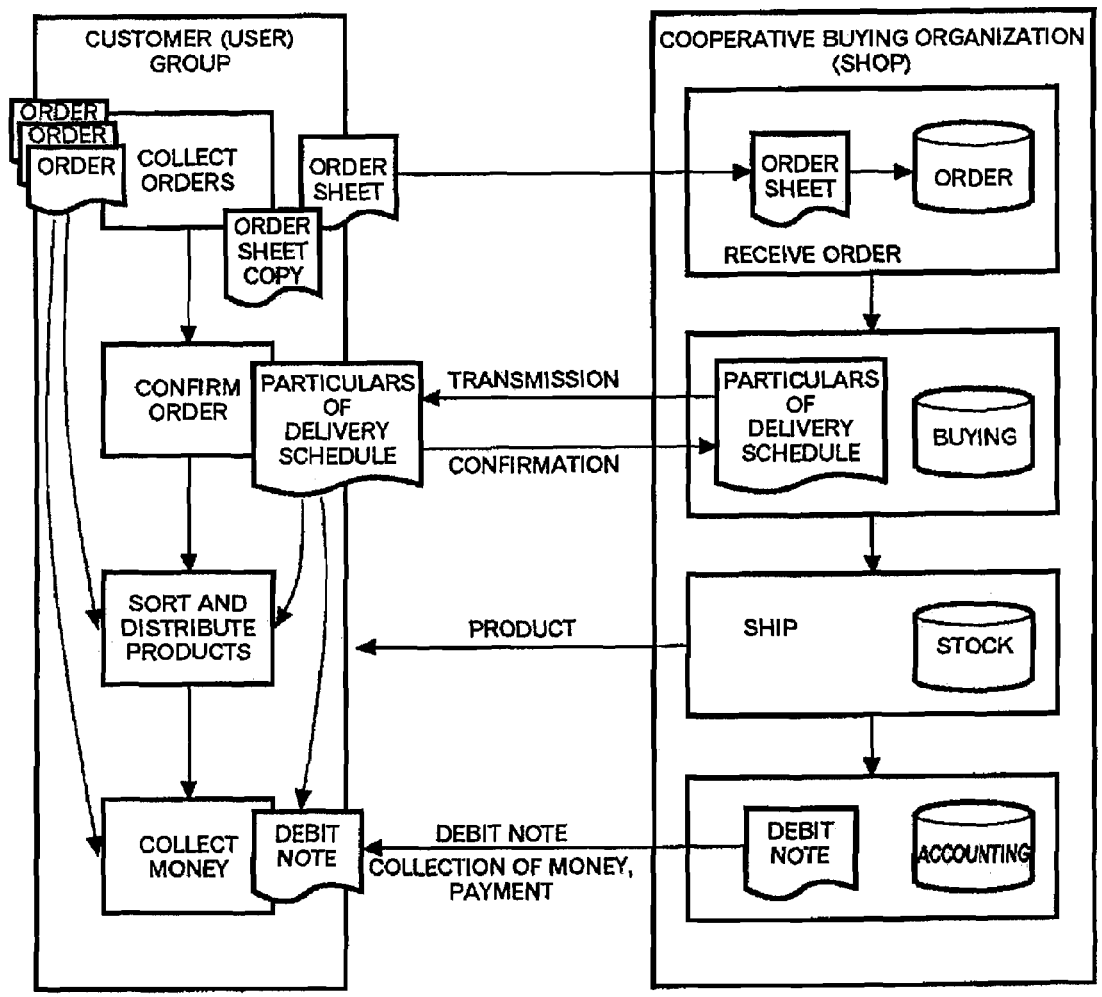
FIG. 2 is a diagram showing an operational flow of the conventional product purchase system.
Figure 3:
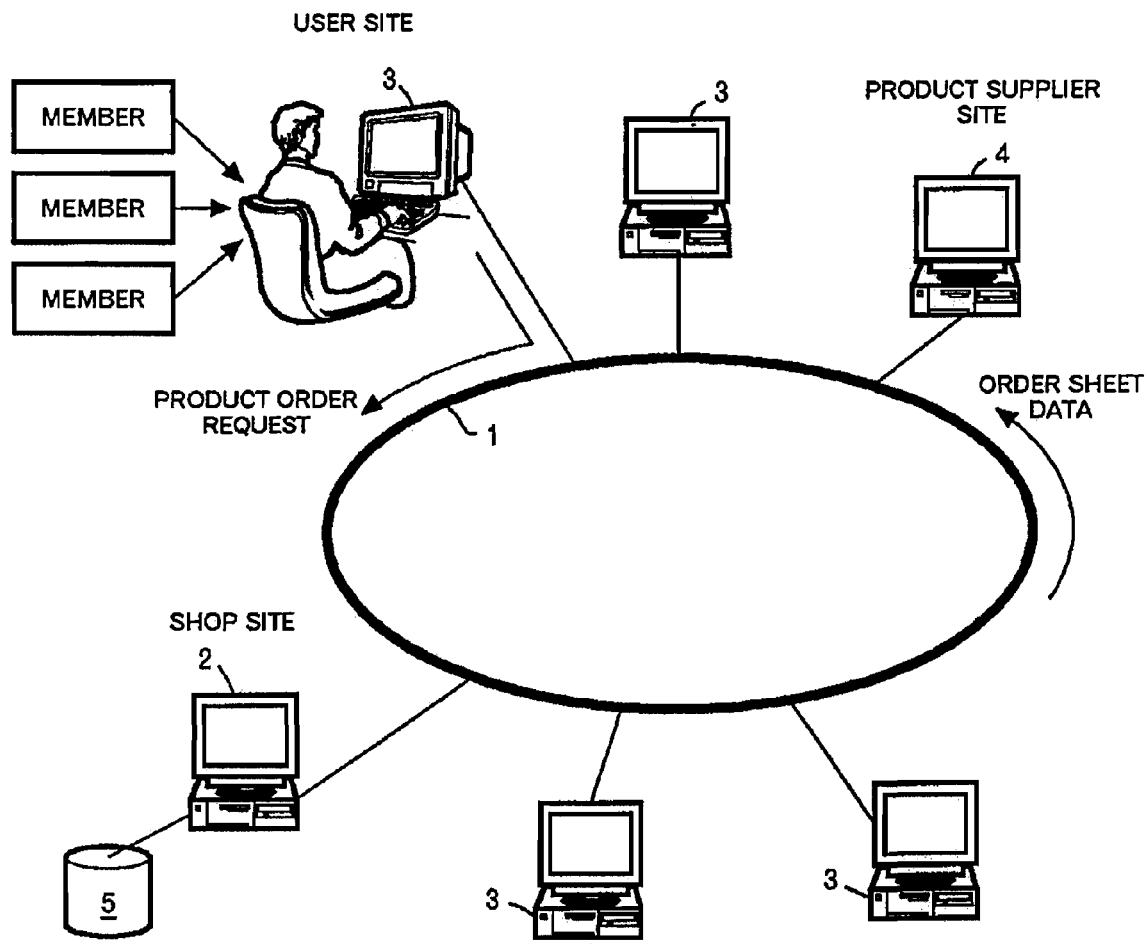
FIG. 3 is a diagram showing a product purchase system according to one embodiment of the invention.

FIG. 3 illustrates a product purchase system according to one embodiment of the invention. In the embodiment shown in FIG. 3, a shop and a product supplier are separate organizations, and upon receiving orders from users, the shop buys products from the product supplier which may be a producer or a wholesaler. The shop may also provide products from their own stock. The shop may also be a product supplier if the shop can supply all the products from its own stock. The product purchase system of the invention according to the embodiment shown in FIG. 3 includes a server 2 located in a shop and connected to a network 1, computers 3 for transmitting product purchase request signals to the server 2, and a computer 4 located at a product supplier site and connected to the network 1. A user may be a general member or a group consisting of multiple members. FIG. 3 shows that a group leader who has collected orders from group members enters a product order request at the computer 3. While only one shop site and only one product supplier site are shown in FIG. 3, multiple shops and multiple product suppliers may be present depending on the nature of transactions.

The network 1 in the embodiment is preferably the Internet, but any other networks may be used so long as information can be remotely exchanged, such as optical communication, LAN or WAN, using an appropriate communication protocol. A typical communication protocol is TCP/IP, but other protocols may also be used.

In the embodiment shown in FIG. 3, the server 2 is located at a shop such as a cooperative. The server 2 receives product order requests from the computers 3 located at user sites, and identifies products and their quantities from the product order requests by means of a database 5 of the server 2.

The products and their quantities thus identified are stored in an appropriate memory or buffer memory, and are respectively added to data in corresponding fields in the database 5 specifying the identified products and the quantities. Then, when a predetermined date, for example, deadline date designated in the product catalog has come, the server 2 fixes, as order sheet data, accumulated data including types and quantities of the products accumulated in the database 5. In the embodiment shown in FIG. 3, the order sheet data are transmitted via the network 1 to the computer 4 located at the product supplier site so that the product supplier is notified of the types and quantities of the ordered products immediately after the predetermined deadline date.

The computers 3 are located at the user sites of general members or group members of, for example, a shop, such as a cooperative, for purchasing products, or a mail-order house.

The users transmit their product order requests to the server 2 by inputting necessary data to the computers 3. A keyboard or a pointing device such as a mouse or stylus may be used to input to the computer.

Figure 4:
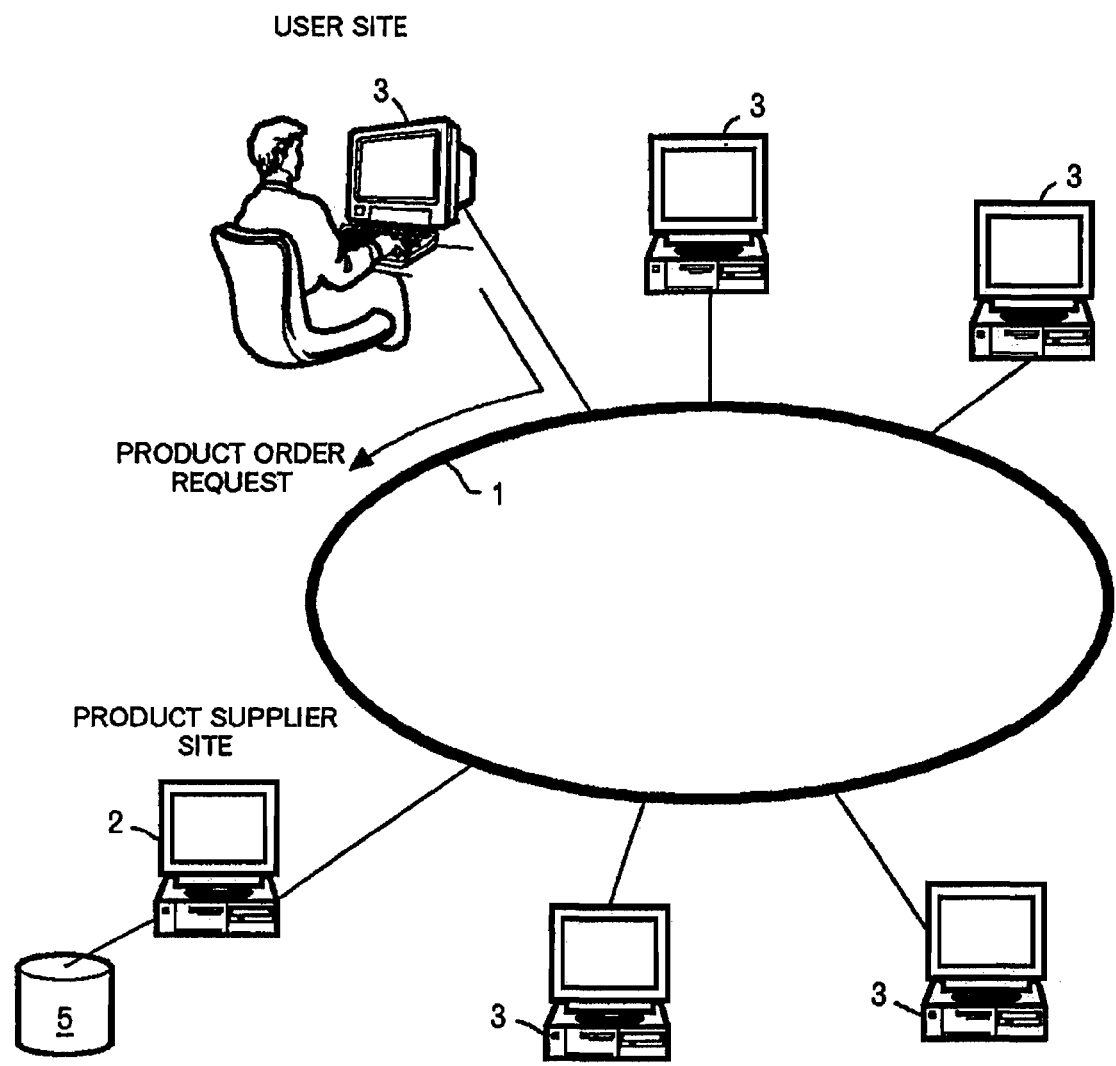
FIG. 4 is a diagram showing a product purchase system according to another embodiment of the invention.

FIG. 4 illustrates another embodiment of the product purchase system according to the present invention. The embodiment shown in FIG. 4 is different from the one shown in FIG. 3 in that the server 2 is not located at a shop, such as a cooperative, but at a site of a product supplier that supplies vegetables, special goods, etc. In the embodiment shown in FIG. 4, since a transaction for purchasing a product is directly conducted between a user and a product supplier without any intermediary shop such as a cooperative, product distribution can be performed more quickly. In this case, the server 2 may be connected to another computer via another network (not shown) such as LAN. In the embodiment shown in FIG. 4, when a predetermined deadline date has passed, the server 2 aggregates the product order requests for each product, fixes the aggregated data as order sheet data, and outputs the order sheet data at the product supplier site by appropriate means such as displaying or printing means.

The server 2, the computers 3 and the computer 4 may be constituted by a personal computer or a workstation. The personal computer or the workstation is equipped with a CPU such as Pentium (trademark of Intel Corporation) or a compatible CPU that can run an operating system such as Windows NT (trademark of Microsoft Corporation), OS/2 (trademark of International Business Machines Corporation), AIX (trademark of International Business Machines Corporation), UNIX (trademark of X/Open), or LINUX. Note, however, that the server 2, the computers 3 and the computer 4 are not limited to such a personal computer or workstation.

Figure 5:
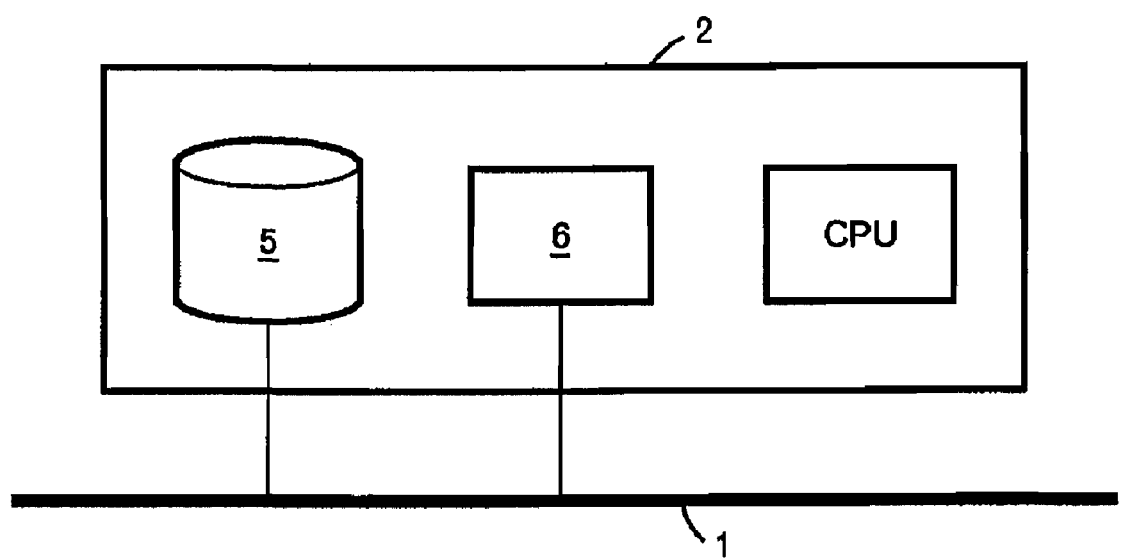
FIG. 5 is a block diagram showing the configuration of a server according to the invention.

FIG. 5 shows in detail the structure of the server 2 used for the present invention. The server 2 is connected to the network 1 using an appropriate communication protocol such as TCP/IP. The server 2 is equipped with means, e.g., CPU, for receiving product order requests for the purchase of products and reading from the product order requests the number of products. The product order request may include, for example, a product type m, a quantity n and a time stamp d. The CPU reads, from the product order request received by the server 2, the product data m indicating the product type and the quantity data n indicating the product quantity, stores these data in an appropriate storage means 6 such as a buffer memory, and adds these data to the corresponding product field and quantity field in the database 5 to generate aggregated data using the product data m and the quantity data n included in the product order requests. Various storage means such as RAM and EPROM including flash memory may be used as the buffer memory.

When the predetermined deadline date has passed, the server 2 inhibits addition and correction in the database 5 for product order requests received thereafter, and fixes, as order sheet data, the data stored in the database 5 and aggregated for each product type. Then, in the embodiment shown in FIG. 3, the server 2 transmits the fixed order sheet data to the shop or the computer 4 located at the product supplier site, and completes the product ordering process.

In the embodiment shown in FIG. 4, since the server 2 is not located at the shop but at the product supplier site, the order sheet data need not be transmitted via the network 1. The order sheet data are output in an appropriate way, e.g., display or hard copy, in the server 2 or a separate computer connected to the server 2 via LA, and provided as normal order sheet data fixed for the product supplier.

Figure 6:
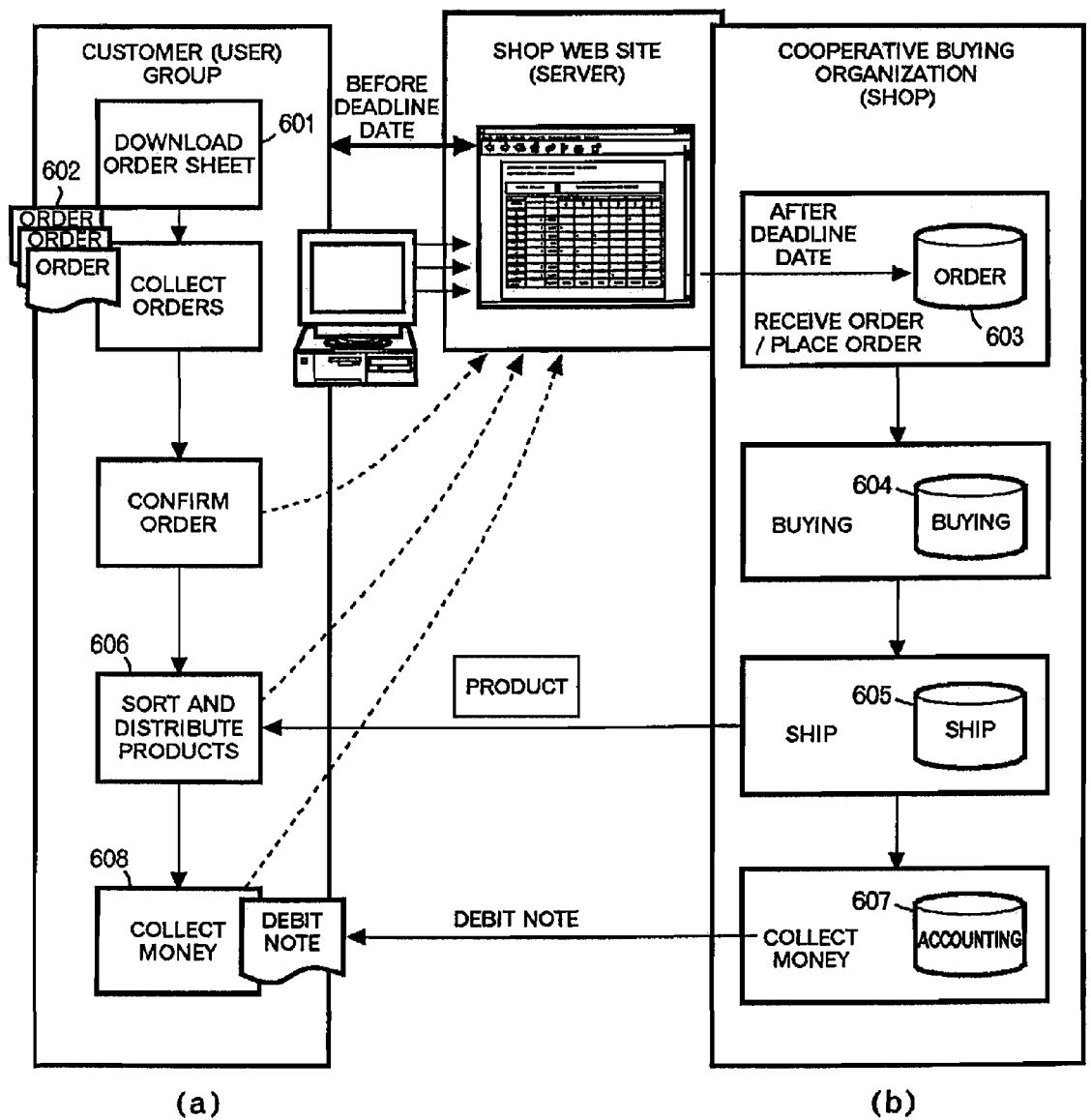
FIG. 6 is a block diagram showing an operational flow of the product purchase system of the invention.

FIG. 6 is a schematic block diagram showing a general flow of a product purchase method according to the embodiment shown in FIG. 3. In FIG. 6, it is assumed that a user performs group purchasing. Processing on the user side is shown in the left block (a) in FIG. 6, and processing at the shop such as a cooperative is shown in the right block (b) in FIG. 6. Shown in the center of FIG. 6 is an order sheet displayed on a display screen of the computer 3 by the server 2 using an appropriate web software. Explaining the processing in block (a), the user, e.g., group leader, first accesses the server 2 for an order sheet provided from the shop which is valid until next deadline date, during a predetermined period of time before the order deadline date, to download the order sheet and a product catalog.

At step 601, the leader downloads the order sheet, makes hard copies thereof using an appropriate means such as a printer, distributes them to multiple group members, and requests the members to fill out the copied order sheets. At step 602, the leader collects the order sheets from the group members, aggregates the orders, and inputs the aggregated results in predetermined fields in the displayed web order sheet. FIG. 7 illustrates a format of the order sheet provided for the group. On the order sheet shown in FIG. 7, predetermined fields for inputting product quantities may be displayed by, for example, black numerals.

The total quantity and amount of money for each product and the total amount of money for each group member may be automatically calculated and displayed in predetermined fields on the displayed web order sheet, e.g., in fields designated by blue characters. In FIG. 7, two columns "Quantity" and "Total" and the lowest row "Grand Total" are automatically calculated. As a result, the leader can use the displayed web order sheet as a worksheet, and totalizing error and calculation time can be reduced. FIG. 8 illustrates a format of the order sheet to be used for general members who do not belong to any group. In the order sheet shown in FIG. 8, product name, quantity, total amount of money for each product, and grand total are indicated. The user need only input a quantity in a corresponding field, in the same manner as for the order sheet shown in FIG. 7, and the subtotal for each product and the grand total can be automatically calculated.

Returning to FIG. 6, the leader is permitted to sum up orders or to correct or cancel data that were previously input before the predetermined deadline date comes so that the system can flexibly cope with changes in the orders. When the predetermined deadline date has passed, the aggregated data is fixed as the order sheet data. Thereafter, the leader can view the order sheet data, but cannot make any changes in the input data through the web software, and the order sheet data is generated from the aggregated data at that time. The order sheet data are used by the shop for ordering as indicated at step 603 in the right block (b) in FIG. 6.

The shop orders products from the product supplier based on the fixed order sheet data, stocks the products at step 604, and ships or delivers the products to the user at step 605. On the user side, the group leader receives the delivered products, and sorts them and distributes to the respective group members at step 606. After the products have been delivered, the shop either mails a debit note or transmits it via the network 1 to the leader. Upon receiving the debit node, the leader collects money from the group members and pays to the shop at step 608. If no leader is required, each user and the shop may communicate with each other via the web page.

Figure 9:
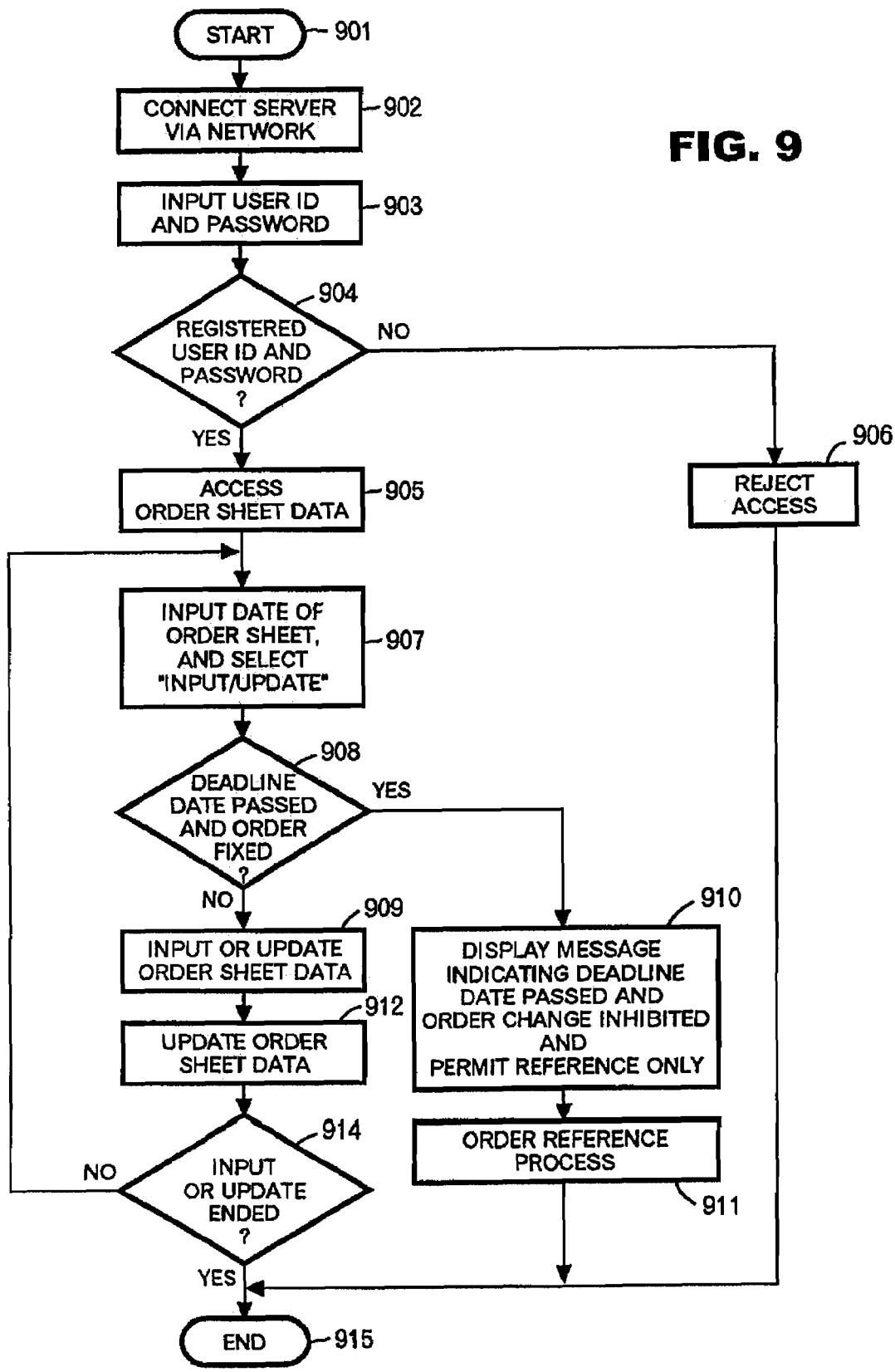
FIG. 9 is a flowchart of a product purchase method according to the invention.

A flowchart for the product purchase method according to the present invention is shown in FIG. 9. The method is initiated at step 901, and a user accesses the server via the network 1 at step 901. Then, the user inputs a user ID and a password for user authentication at step 903, which were given to the user upon making an agreement. Then, at step 904, the server 2 authenticates the user by determining whether the input user ID and password match a registered user ID and password. If they do not match the registered ones (N), access to the server 2 is rejected at step 906, and the process is terminated.

Figure 12:
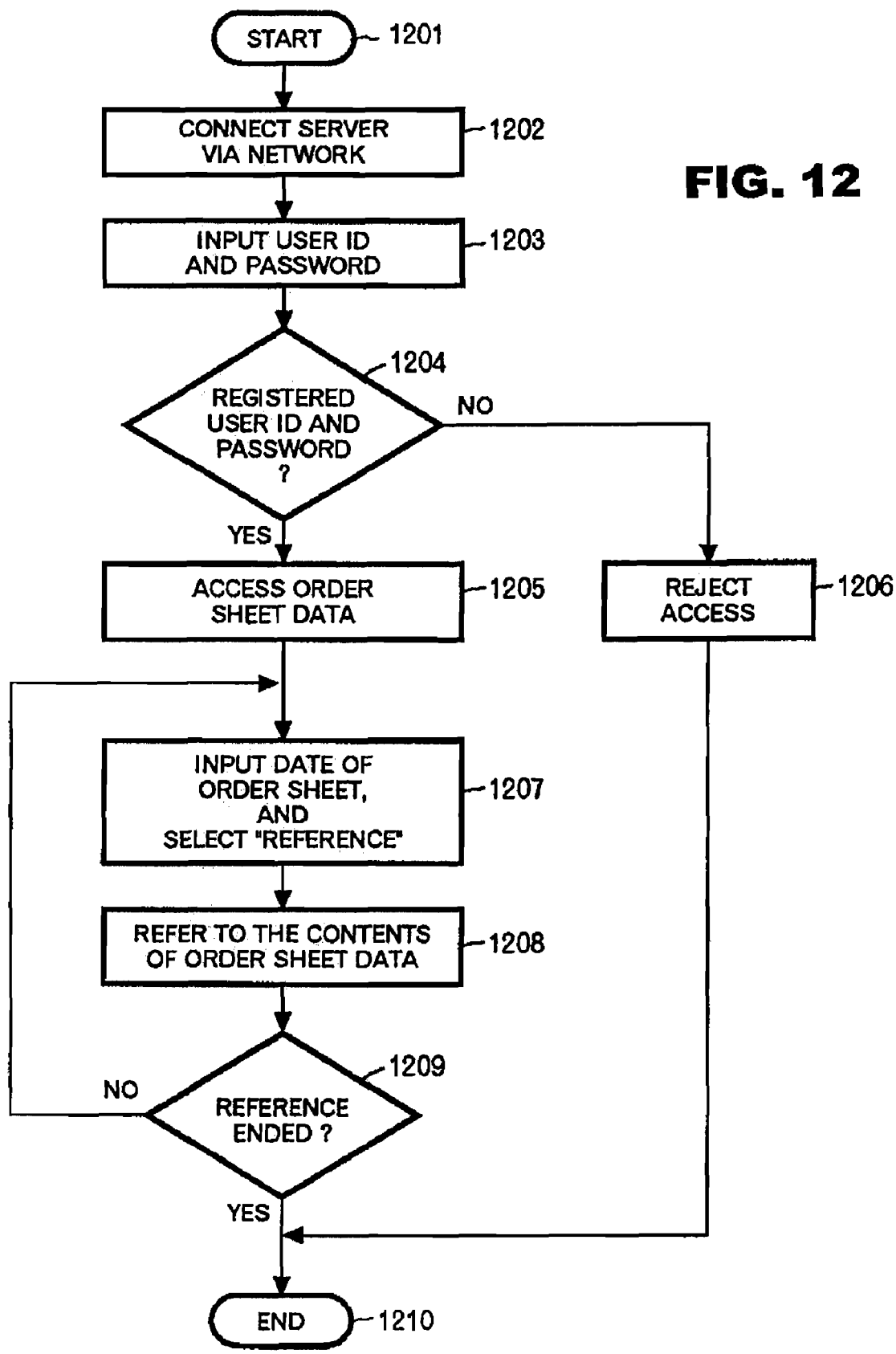
FIG. 12 is a flowchart for a reference process in the product purchase method of the invention.

If the input user ID and password match the registered ones (Y), the user is permitted to access the order sheet data at step 905, and inputs the date on the order sheet and clicks on an "input/update" button on the display screen. At step 908, it is determined by an order fixing process whether the deadline date has passed and the order has been fixed. The order fixing process will be described later with reference to FIG. 10. If the deadline date has passed (Y), at step 910 a message is displayed at step 910 indicating that the deadline date has passed and the order can not be changed, permitting reference only. Then, an order reference process shown in FIG. 12 is executed at step 911, and the product purchase method of the invention is terminated.

If the deadline date has not yet passed (N), the user inputs new data to be added to the order sheet data stored in the database 5 of the server, or updates or corrects the input data at step 912 using, for example, the keyboard. At step 913, the new input data are transmitted to the server 2 and stored in the database 5 to correct the order sheet data. Then, at step 914, it is determined whether the data input or update should be terminated. If the user does not desire to input and/or update data (Y), the product purchase method of the invention is terminated at step 915. If the user desires to continue inputting and/or updating the order sheet data (N), the flow returns to step 907 allowing the user to input the date on the order sheet and select the input/update operation again. Thus, the order sheet data can be input and/or updated repeatedly at user's desire.

Figure 10:
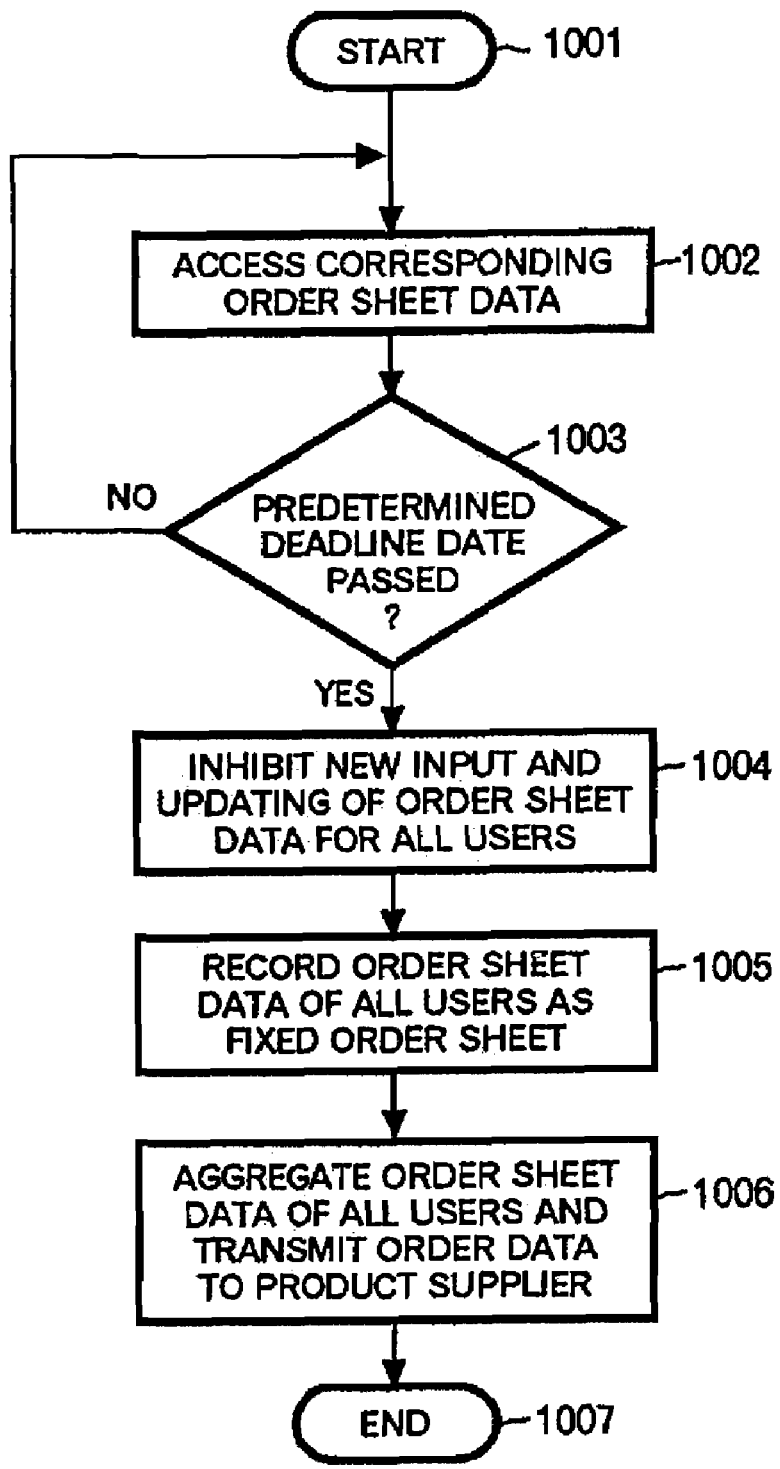
FIG. 10 is a flowchart for an order fixing process in the product purchase method of the invention.

A detailed flowchart for the order fixing process according to the present invention is shown in FIG. 10. The order fixing process of FIG. 10 is executed on the order sheet data when a deadline date set for each order sheet has passed, which is determined by a timer of the server 2 for each order sheet data. The order fixing process of FIG. 10 is initiated at step 1001, and order sheet data corresponding to that deadline date are accessed at step 1002. At step 1003, it is determined whether the deadline date given in advance to the order sheet data has passed. This determination may be done by examining a time stamp which indicates a deadline date and may be included in the order sheet data stored in the database 5. If the deadline date has passed (Y), any new input and update of the order sheet data are inhibited for all users at step 1004.

Step 1004 may be executed by comparing the time stamp included in the order sheet data with the time stamp d included in the product order request received from the user, or by inhibiting any user input to the order sheet data. Any other method may also be used to reject writing to the order sheet data.

Then, the order sheet data of all users corresponding to the predetermined deadline date are registered as fixed order sheets at step 1005, the order sheet data are aggregated for each product and sent to the order receiving system to transmit the order data to the product supplier at step 1006, and then the deadline date processing is terminated at step 1007. This order receiving system may be installed at a stock management site of a cooperative if the server 2 is located at the cooperative, or may be installed at a manufacturer or producer site which actually produces the products. If the server 2 is not installed at the cooperative but at the manufacturer or producer site, the order reception may be performed internally by the server 2.

FIG. 11 illustrates an exemplary fixed order sheet obtained in the above described manner.

FIG. 12 is a flowchart of the reference processing for the product purchase method of the invention that permits a user to refer to the order sheet data. The reference processing shown in FIG. 12 is initiated at step 1201, and the user is connected via the network to the server 2 at step 1202. At step 1203, the user inputs a user ID and a password, and at step 1204, the user is authenticated. If, at step 1204, the user ID and password input by the user do not match the ones registered in advance for the user, the access is rejected at step 1206, and the reference process is terminated. If, at step 1204, the user is successfully authenticated (Y), access to the order sheet data is permitted at step 1205. Then, at step 1207, the date of the order sheet is input in order to identify the order sheet data, and "reference" is selected. If multiple types of order sheets have the same date, a field may be provided for storage of an order sheet code for the order sheet data stored in the database 5 so that the user may identify the order sheet by inputting the order sheet code.

When "reference" is selected, the server 2 may operate to prevent the user from modifying the order sheet data so that the order sheet data may not be changed unintentionally by, for example, erroneous keyboard operations of the user. Then, at step 1208, the server 2 displays the contents of the order sheet data to the user via the web page to allow the user to refer to the current order sheet data. At step 1209, it is determined whether the user has decided to continue or end the reference by clicking a "reference continue button" or "reference end button" on the web page. If the reference is to be ended (Y), the flow goes to step 1210 where the reference process is terminated. If the reference is to be continued, the flow returns to step 1207 to display the screen for inputting the date of the order sheet and for selecting "reference".

Figure 13:
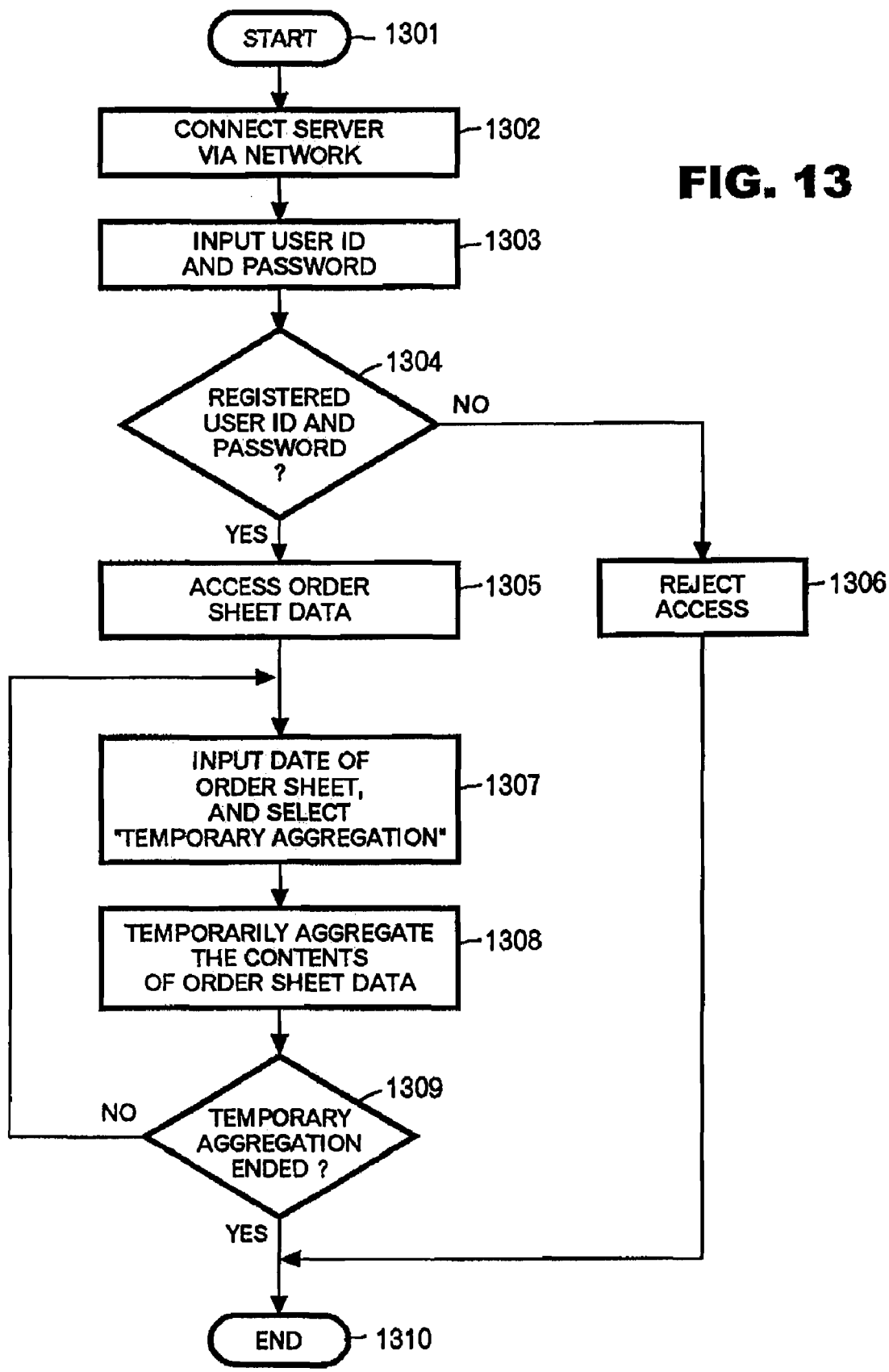
FIG. 13 is a flowchart for a temporary aggregation process in the product purchase method of the invention.

Further, before the deadline date is reached, temporarily aggregated data may be provided by an access from the shop site or the product supplier site whereat the server 2 is installed so that the shop or the product supplier which receives orders can determine the intermediate order reception situation. FIG. 13 is a flowchart for a process for providing temporarily aggregated data when a request is issued from the product supplier site. The process shown in FIG. 13 is initiated at step 1301, and the product supplier is connected to the server 2 via the network 1 at step 1302.

At step 1303, a user ID and a password are input by the product supplier, and at step 1304, authentication is performed. The authenticating steps 1303 and 1304 may not be used if the shop site such as the cooperative whereat the server 2 is located performs the temporary aggregation.

If, at step 1304, the user ID and the password input by the product supplier do not match the ones registered in advance for the product supplier, access is rejected at step 1306, and the temporary aggregation process is terminated. If, at step 1304, the product supplier is successfully authenticated (Y), the product supplier is permitted to access the order sheet data at step 1305, and inputs the date of the order sheet and select the "temporary aggregation" at step 1307.

At step 1308, the server 2 aggregates the orders submitted by all the users for each product, and displays the contents of the temporary aggregation of the order sheet data for the products to the product supplier via the web page. The product supplier may make a hard copy of the temporarily aggregated data as needed to confirm the temporary aggregation of the current order sheet data so that the products can be prepared ahead of time. At step 1309, it is determined whether the product supplier has decided to continue or end the temporary aggregation by clicking a "temporary aggregation continue button" or "temporary aggregation end button" on the web page. If the temporary aggregation is to be terminated (Y), the process goes to step 1310 where the temporary aggregation process is terminated. If the temporary aggregation is to be continued, the process returns to step 1307 to display the screen again for inputting the date of the order sheet and for selecting the "temporary aggregation process". FIG. 14 illustrates an exemplary temporarily aggregated data displayed on the display window of the server 2 by the temporary aggregation program described above.

In the embodiment shown in FIG. 13, the product supplier, including the shop, uses the temporarily aggregated data as order reception status data to get hold of the order reception status in real time so that the product supplier can prepare the products in advance in accordance with the current order reception status. As a result, the products can be supplied quickly. Furthermore, according to the product purchase method of the invention, the troubles that may occur due to erroneous buying and ordering of products can be reduced, and the efficiency of the product distribution can be improved.

Also, according to the product purchase method of the invention, the server 2 may present a display screen on the web to permit the users, manufacturer and/or producer to confirm delivery status after a predetermined period of time has elapsed following the product delivery to the users.

FIG. 15 illustrates a display screen for confirming the product delivery presented to the computer 3 located at the user site. The above predetermined period of time may be one week following the delivery, but a different period may also be set while taking geographical situation into consideration. If all the products have been delivered when this screen is displayed on the web, the user clicks on the "Yes" button on the screen to notify the server 2, i.e., the product supplier such as the shop, the manufacturer or the producer, that the delivery has been completed. If the delivery has not yet been completed, the user clicks on the "No" button to so notify the product supplier. Thereafter, a display screen for inquiring about a product or products that have not yet been delivered may be presented. The delivery status may be presented at any time to confirm that the products have been correctly delivered, as an after-sales service of the shop or product supplier.

When the product delivery process has been completed, a bill is sent to the user from the shop or product supplier by, for example, e-mail. Upon receiving the bill, the user may remit payment by cash, or pay by a credit card that has been designated in advance, or pay by electronic money, if possible.

FIG. 16 illustrates a display screen for presenting an order sheet on the web page of the computer 3 of a group leader for group purchasing according to the product purchase method of the present invention. The order sheet used in the present invention contains a deadline date in the topmost field. The order sheet shown in FIG. 16 also contains a user or customer group ID since the users constitute a group. In the field below the customer group ID, an order column and a quantity/money/remark column are provided. The order sheet shown in FIG. 16 further contains columns for entering product names, quantities, total amount of money, and the individual orders of group members, under the above described fields.

In the order sheet shown in FIG. 16, when the group leader inputs the orders of the group members in the fields of the quantity/money/remark column, the quantity and total amount of money are automatically calculated for each product, and the grand total and subtotal for each member are automatically calculated in the lowermost portion of the order sheet. The shaded portions in FIG. 16 represent the totals automatically calculated, which may also be represented in different colors to permit visual identification on the web page, e.g., black numbers may be used for the data input fields while blue numbers may be used for the automatic calculation fields. Such an order sheet may be generated by installing any known database software or spreadsheet software on the server 2 and using, for example, a CGI system.

Figure 17:
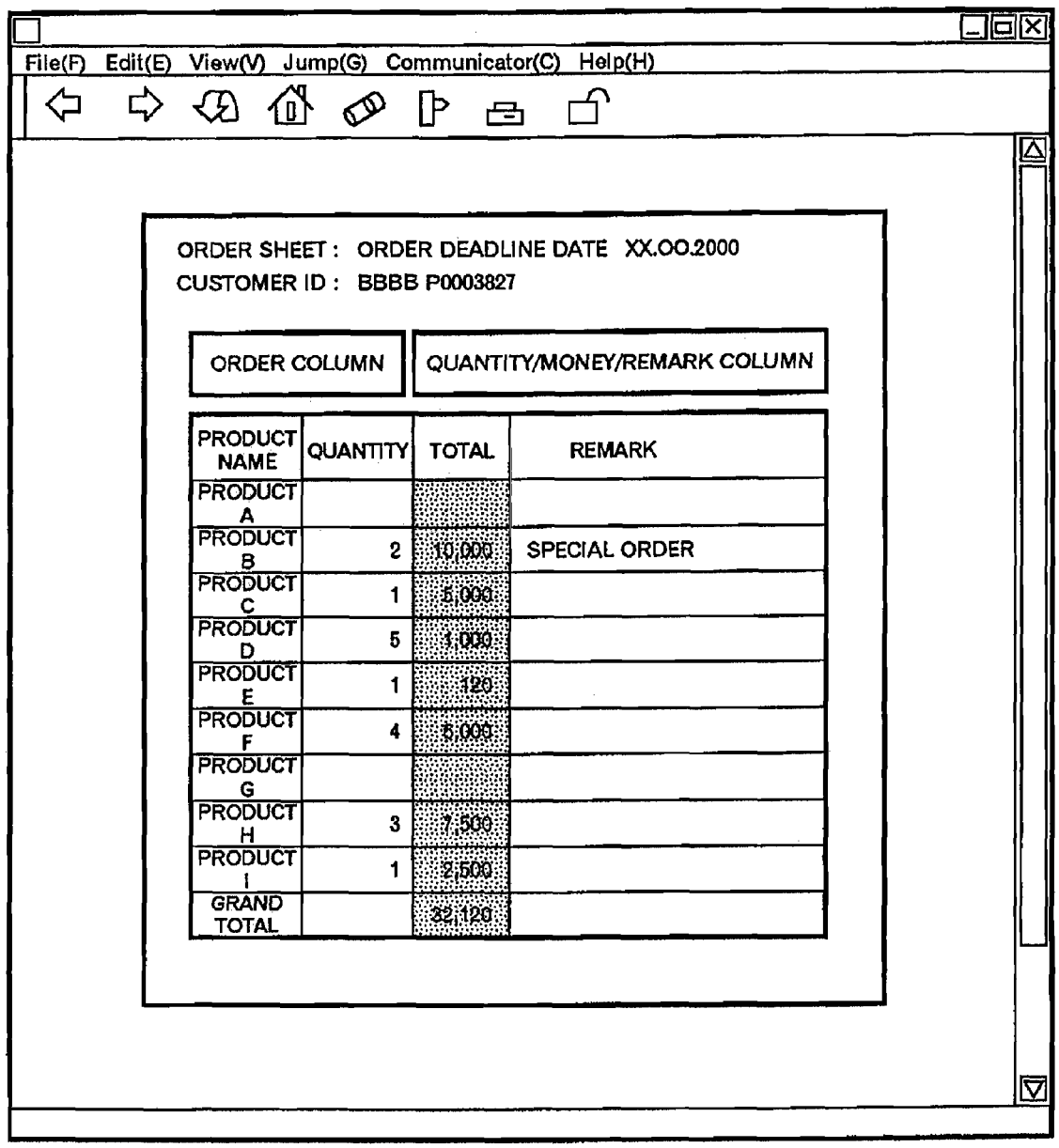
FIG. 17 is a diagram showing a display screen of an alternative order sheet presented to a user on a web page according to the product purchase system of the invention.

FIG. 17 illustrates an alternative order sheet which may be used in the present invention. The order sheet shown in FIG. 17 is used for individual users to input their orders, rather than a group consisting of multiple members as shown in FIG. 16. In the order sheet shown in FIG. 17, product names, quantities, remarks concerning the products, subtotal for each product and grand total are indicated. When a user inputs a quantity or quantities of products to be purchased in the corresponding fields, the subtotal for each product and the grand total can be automatically calculated and displayed in the shaded portion.

Figure 18:
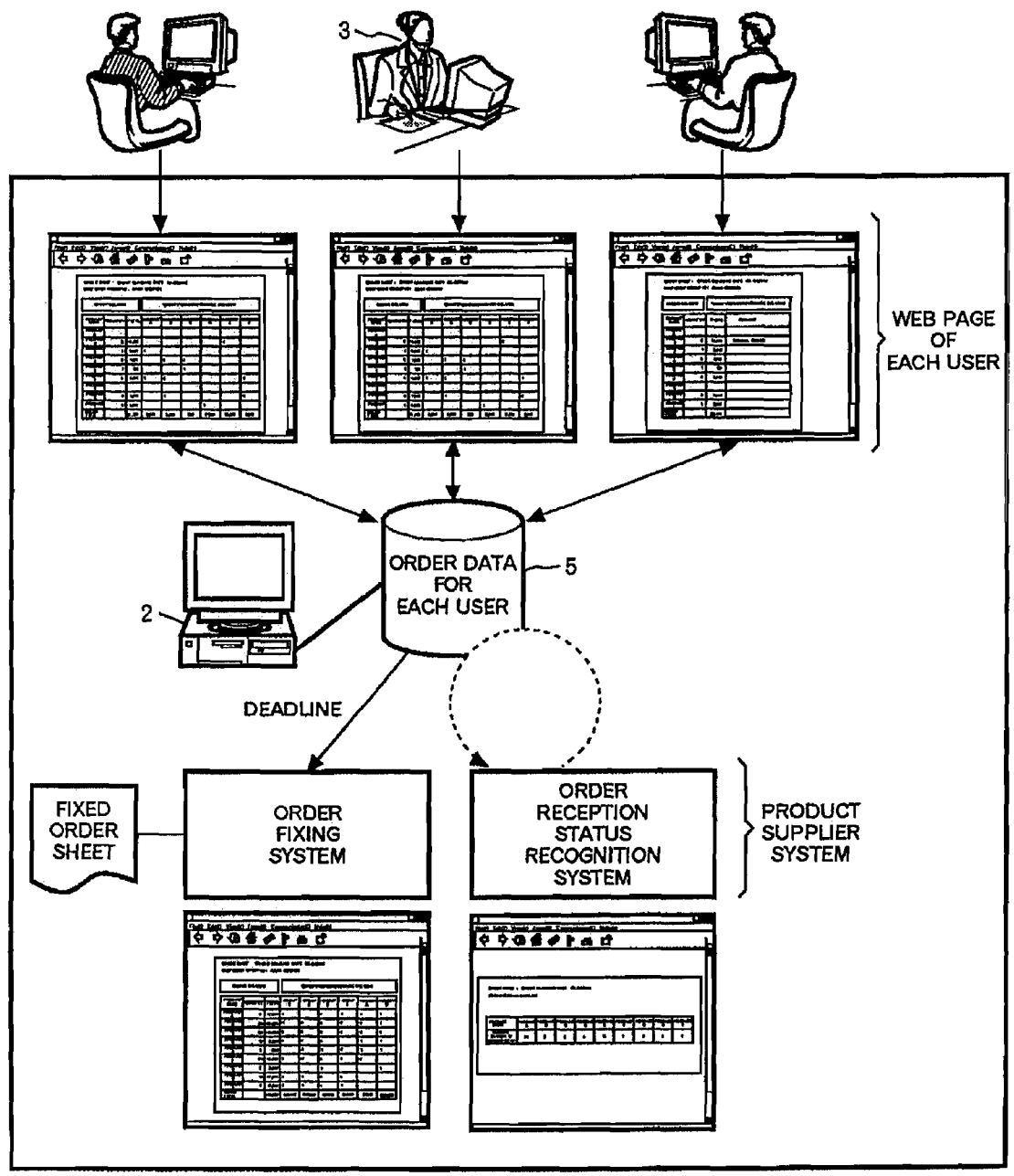
FIG. 18 is a diagram showing the product purchase system of the invention in which multiple users are accessing a server.

FIG. 18 illustrates the product purchase system of the present invention wherein multiple users access the server 2. In FIG. 18, a web page is displayed for each user. The individual users access to the database 5 of the server 2 via their computers 3, and product order requests are aggregated for each user in the database 5 of the server 2. According to the product purchase system of the present invention shown in FIG. 18, an order reception status recognition program is invoked periodically or as needed to get hold of the progress of order reception status. When the order deadline date has passed, the server 2 fixes, as order sheet data, the data accumulated in the database 5, aggregates the orders for each product to obtain the total quantity of each product, and outputs order sheet data in the form of, for example, hard copy for use in ordering products from a product supplier or a wholesaler, or transmits the order sheet data as needed.

The program for executing the product purchase method of the present invention described above may be written in various programming languages, specifically in the object-oriented C language. A program written in such a language for the execution of the product purchase method of the present invention may be stored on a variety of recording media, such as a floppy disk, a CD-ROM, a hard disk, a magnetic tape, a DVD and a magneto-optical disk.

While the product purchase system, the product purchase method and the storage medium according to the present invention have been described with regard to the preferred embodiments, the present invention is not limited to the above embodiments, and may be used in an order receiving and placing system for a cooperative, in a direct delivery/trading system for directly purchasing products from farms or the like, or in an order receiving and placing system of a mail-order system that periodically updates product catalogs.

As described above, the present invention provides a product purchase method which saves cost and labor since the database software need only be installed on the server 2, no special program other than browser software is required for the computers of individual users, and a product catalog or an order sheet need not be transmitted to the users each time it is changed. Furthermore, since the users can use the web site as their worksheets, efficient and error-free product purchasing with superior operability can be performed. The present invention further provides an efficient product purchase system which can fix orders from multiple users at once since neither an order sheet nor order data need be transmitted from user's computers to a shop before a deadline date.

Thus, the present invention provides a product purchase system, product purchase method, and a storage medium recording a program for executing the product purchase method which can considerably save time and labor to aggregate orders with line delays, troubles, and differences in input times being reduced.

The present invention further provides a product purchase system, product purchase method, and a storage medium recording a program for executing the product purchase method which do not require any confirmation from the shop after ordering, and can considerably improve efficiency of collection and payment processes and product distribution.

The invention claimed is:
1. A product purchase method using a computer network comprising the steps of:
  updating, via said computer network, order sheet data stored in a database included in a server, wherein said order sheet data is order sheet data for each buyer;
  inhibiting the updating of said order sheet data after a predetermined date, wherein, until said predetermined date is reached, said order sheet data for each buyer can be corrected by respective buyers at any time via said computer network;

aggregating said order sheet data of each buyer by summing up quantities of ordered products for each type of the ordered products to obtain aggregated data after said predetermined date;

fixing, as order data, said order sheet data for each buyer and said aggregated data after said predetermined date;

delivering said ordered products to the respective buyers based on said order sheet data; and storing delivery confirmation as information corresponding to said order sheet data for each buyer in said server when buyers confirm delivery of said ordered products, whereby said buyers can refer to a status of said delivery at any time via said computer network.

2. The product purchase method according to claim 1, wherein said step of updating said order sheet data via said computer network includes a step of permitting each buyer to refer to said order sheet data at any time before said predetermined date is reached.

3. The product purchase method according to claim 1, wherein, even after said predetermined date has been reached, said order sheet data can be referred to by each buyer at any time via the computer network.

4. The product purchase method according to claim 1, further comprising the steps of:

summing up the quantities of ordered products for each type of the ordered products included in the order sheet data of each buyer to obtain temporary aggregated data before said predetermined date is reached; and providing said temporary aggregated data as order reception status data to be referred to.

5. The product purchase method according to claim 1, which is used in an order receiving and placing system of a cooperative, a direct delivery system for farm products, or mail order.

* * * * *